United States Patent
Hung et al.

(10) Patent No.: US 9,130,474 B2
(45) Date of Patent: Sep. 8, 2015

(54) POWER TRANSFORMING APPARATUS WITH DIGITAL CONTROL UNIT

(71) Applicant: DELTA ELECTRONICS, INC., Taoyuan Hsien (TW)

(72) Inventors: Yun-Chi Hung, Taoyuan Hsien (TW); Chih-Hung Hsiao, Taoyuan Hsien (TW); Cheng-Yu Lai, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 79 days.

(21) Appl. No.: 13/967,783

(22) Filed: Aug. 15, 2013

(65) Prior Publication Data

US 2014/0313799 A1  Oct. 23, 2014

(30) Foreign Application Priority Data

Apr. 17, 2013  (CN) .......................... 2013 1 0134082

(51) Int. Cl.
| | |
|---|---|
| H02M 7/44 | (2006.01) |
| H02M 3/00 | (2006.01) |
| H02M 7/537 | (2006.01) |
| H02M 1/00 | (2007.01) |

(52) U.S. Cl.
CPC H02M 7/44 (2013.01); H02M 3/00 (2013.01); H02M 7/537 (2013.01); *H02M 2001/0012* (2013.01); *H02M 2001/0025* (2013.01)

(58) Field of Classification Search
CPC ...................................................... H02M 7/537
USPC ................................................ 363/95, 97, 98
See application file for complete search history.

(56) References Cited

U.S. PATENT DOCUMENTS

| | | | |
|---|---|---|---|
| 5,525,874 A | 6/1996 | Mallarapu et al. | |
| 2011/0101932 A1* | 5/2011 | Nakazono | ...................... 323/271 |
| 2012/0176824 A1 | 7/2012 | Franklin et al. | |
| 2013/0328534 A1* | 12/2013 | Hsieh | ............................ 323/271 |

FOREIGN PATENT DOCUMENTS

EP      2 299 577 A1    3/2011

* cited by examiner

*Primary Examiner* — Emily P Pham
(74) *Attorney, Agent, or Firm* — Muncy, Geissler, Olds & Lowe, P.C.

(57) ABSTRACT

A power transforming apparatus implements a transformation of an energy signal and comprises a control unit, a pulse width modulation (PWM) unit, a transformation unit, and a slope compensation unit. The control unit outputs a target power signal. The PWM unit is coupled with the control unit and generates a switch signal. The transformation unit is coupled with the PWM unit, and implements a power transforming of the energy signal to output an energy transformation signal according to the switch signal. The slope compensation unit is coupled with the control unit and the PWM unit, and implements a slope compensation, according to the target power signal and a feedback signal, to output a compensation signal to the PWM unit. The switch signal is generated according to the target power signal and the compensation signal.

18 Claims, 5 Drawing Sheets

POWER TRANSFORMING APPARATUS WITH DIGITAL CONTROL UNIT

CROSS REFERENCE TO RELATED APPLICATIONS

This Non-provisional application claims priority under 35 U.S.C. §119(a) on Patent Application No(s). 201310134082.4 filed in People's Republic of China on Apr. 17, 2013, the entire contents of which are hereby incorporated by reference.

BACKGROUND OF THE INVENTION

1. Field of Invention

The present invention relates to a power transforming apparatus.

2. Related Art

With the rising cost of energy, the raised environmental consciousness and the energy regulations made by countries, the standard of energy transformation efficiency of electronic products seems more and more strict. Thus, a conventional power transforming apparatus, such as a power supply, gradually shows its lack of achieving such standard. Therefore, the switched-mode power supply (SMPS) with better energy transformation efficiency becomes more promising in the market.

The SMPS is mainly divided into an analog control type and a digital control type. Because the analog control type easily generates clipping and thus results in the worse energy transformation efficiency, it is gradually replaced by the digital control type. The digital control type can overcome the drawback of the analog control type by using the proportional integral derivative controller (PID controller). However, the PID controller is short of the slope compensation mechanism, and therefore, if the feedback system is affected by noise signals to generate unexpected computing result of the PID controller, the output oscillation will occur. Besides, the PID controller needs to execute a great deal of computation so it needs to be configured with a micro control unit (MCU) with higher processing efficiency, and therefore the total cost will be increased.

Therefore, it is an important subject to provide a power transforming apparatus that is not only capable of slope compensation mechanism but has less computation so that the cost can be reduced.

SUMMARY OF THE INVENTION

In view of the foregoing subject, an objective of this present invention is to provide a power transforming apparatus that is not only capable of slope compensation mechanism but has less computation so as to reduce cost.

To achieve the above objective, a power transforming apparatus according to the present invention implements a transformation of an energy signal and includes a control unit, a pulse width modulation (PWM) unit, a transformation unit, and a slope compensation unit. The control unit outputs a target power signal. The PWM unit is coupled with the control unit and generates a switch signal. The transformation unit is coupled with the PWM unit, and implements a power transforming of the energy signal to output an energy transformation signal according to the switch signal. The slope compensation unit is coupled with the control unit and the PWM unit, and implements a slope compensation, according to the target power signal and a feedback signal, to output a compensation signal to the PWM unit. The switch signal is generated according to the target power signal and the compensation signal.

In one embodiment, the control unit outputs a descending tendency signal to the slope compensation unit. The slope compensation unit processes the target power signal to generate a ramp signal according to the descending tendency signal, and outputs the compensation signal according to the ramp signal and the feedback signal.

In one embodiment, each of the target power signal and the descending tendency signal is a computer instruction.

In one embodiment, the slope compensation unit includes a slope generator, a digital to analog converter and a comparator. The slope generator outputs the ramp signal according to the target power signal and the descending tendency signal. The digital to analog converter is coupled with the slope generator, and converts the ramp signal of digital signal into an analog signal. The comparator is coupled with the digital to analog converter and the PWM unit, and outputs the compensation signal according to the ramp signal and the feedback signal.

In one embodiment, a representative value of the target power signal is more than a required value of an actual transformation.

In one embodiment, the energy signal is processed with a full wave rectification.

In one embodiment, the control unit generates the target power signal according to the voltage of the energy signal and the feedback signal.

In one embodiment, the transformation unit is a DC to AC transformation unit or a DC to DC transformation unit.

In one embodiment, the target power signal is corresponding to a target current value of the energy signal after the transformation.

In one embodiment, the power transforming apparatus further includes a feedback unit, which generates the feedback signal according to the energy transformation signal.

As mentioned above, the power transforming apparatus according to the present invention uses the digital dynamic slope compensation mechanism to eliminate the problem of second harmonic generation. Therefore, the stability of the outputted energy transformation signal is enhanced and the noise influence is reduced. Besides, by using the outputted current as the feedback, the failure of the power transforming apparatus due to the overhigh current can be prevented, and thus the reliability is increased.

BRIEF DESCRIPTION OF THE DRAWINGS

The present invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
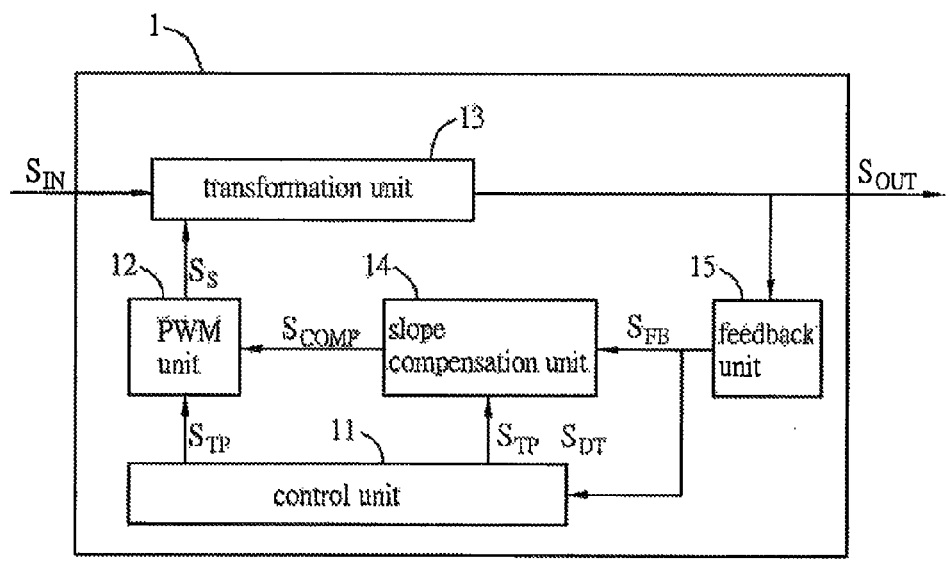
FIG. 1 is a schematic block diagram of a power transforming apparatus according to a preferred embodiment of the present invention.

FIG. 1 is a schematic block diagram of a power transforming apparatus according to a preferred embodiment of the present invention. As shown in FIG. 1, the power transforming apparatus 1 transforms an energy signal $S_{IN}$ into an energy transformation signal $S_{OUT}$ and outputs the energy transformation signal Sour. For example, the energy signal $S_{IN}$ can be a direct current (DC) voltage signal, and the power transforming apparatus 1 transforms the DC voltage signal into an alternating current (AC) voltage signal (i.e. DC to AC) to output the energy transformation signal $S_{OUT}$. Otherwise, the energy signal $S_{IN}$ can be a DC voltage signal, and the power transforming apparatus 1 transforms the DC voltage signal into a DC voltage signal (i.e. DC to DC) to output the energy transformation signal Sour. Thereby, the outputted energy transformation signal $S_{OUT}$ can meet the requirement of the load (not shown). Herein as an example, the power transforming apparatus 1 transforms the DC voltage signal into the AC voltage signal. Besides, the power transforming apparatus 1 can implements a full wave rectification to the energy signal $S_{IN}$.

The power transforming apparatus 1 includes a control unit 11, a pulse width modulation (PWM) unit 12, a transformation unit 13, a slope compensation unit 14 and a feedback unit 15.

As an embodiment, the control unit 11 can be a micro control unit (MCU) for example to output a target power signal $S_{TP}$, which can be a computer instruction. Practically, the control unit 11 can obtain the voltage or current value of the energy signal $S_{IN}$ inputted to the power transforming apparatus 1 and a feedback signal $S_{FB}$ to output the target power signal $S_{TP}$. The feedback signal $S_{FB}$ can be the voltage or current value of the energy transformation signal $S_{OUT}$ outputted by the power transforming apparatus 1. In this embodiment, for example, the target power signal $S_{TP}$ is generated according to the voltage value of the energy signal $S_{IN}$ inputted to the power transforming apparatus 1, and the feedback signal $S_{FB}$ is the current value of the energy transformation signal Sour outputted by the power transforming apparatus 1. However, this invention is not limited thereto.

The target power signal $S_{TP}$ is used to determine the peak of the output of the transformation unit 13, which can be corresponding to a target current value of the energy signal $S_{IN}$ after the transformation or can be higher than the actual current value obtained after the transformation. The PWM unit 12 is coupled with the control unit 11, and can generate a switch signal $S_S$. In this embodiment, the switch signal Ss can be a pulse width modulation (PWM) signal. The transformation unit 13 is coupled with the PWM unit 12, and can transform the energy signal $S_{IN}$ into the energy transformation signal $S_{OUT}$. In detail, the transformation unit 13 transforms the energy signal $S_{IN}$ into the energy transformation signal Sour according to the switch signal Ss. Practically, the transformation unit 13 can be a DC to AC transformation unit or a DC to DC transformation unit according to the type of the load. Herein, the transformation unit 13 is a DC to AC transformation unit for example.

The feedback unit 15 can be a current sensor (e.g. an inductive element) to sense the current value of the energy transformation signal $S_{OUT}$ that is outputted by the power transforming apparatus 1 to generate the feedback signal $S_{FB}$. When the feedback unit 15 is a current sensor, the system failure of the power transforming apparatus 1 because of the overhigh current can be prevented. The slope compensation unit 14 is coupled with the control unit 11 and the PWM unit 12, and can implement a slope compensation according to the target power signal $S_{TP}$ and the feedback signal $S_{FB}$ to output a compensation signal $S_{COMP}$ to the PWM unit 12. Then, the PWM unit 12 generates the switch signal $S_S$ according to the target power signal $S_{TP}$ and the compensation signal $S_{COMP}$.

For example, the power transforming apparatus 1 operates in a current mode. In the current mode control system, the current feedback signal is usually generated from the inductor current, and thus the generated peak inductor current will be processed directly by the control system of the error signal. Therefore, the failure due to the overhigh current can be prevented. Besides, because the current mode can control and adjust the inductor current, the inductor pole or the delay in the control loop of the whole system can be effectively eliminated, and thereby the transient response of the system is improved.

The current mode control provides many functions, such as the protection of the peak current of the transistor, elimination of the ratcheting of the magnetic field of the magnetic element, restraint of the change of the input voltage, and convenient control loop compensation. In other words, the maximum inductor current is controlled by the error voltage, and thereby the inductor becomes the voltage-controlled current source. As the current source, the inductor will not generate poles in the frequency response of the control loop, which makes the loop become more stable from the unpredicted unstable situation, so that the loop filter can be designed more easily.

The target power signal $S_{TP}$ is a current instruction emitted by the control unit 11 to implement a full wave rectification to the energy signal $S_{IN}$ and determine the peak current of the output of the transformation unit 13, which is higher than the current value of the energy transformation signal $S_{OUT}$. The PWM unit 12 controls the maximum duty cycle of the switch signal $S_S$ according to the target power signal $S_{TP}$. However, because the duty cycle of the switch signal $S_S$ is also affected by the feedback compensation signal $S_{COMP}$, the switch signal $S_S$ may not have the maximum duty cycle. In other words, the duty cycle of the switch signal $S_S$ will be adjusted downward because of the compensation signal $S_{COMP}$.

When the duty cycle of the switch signal $S_S$ is over 50%, the average current outputted by the transformation unit 13 is over half the peak current and higher than the value that is calculated by the measured peak current. In this situation, if there is no operation of the slope compensation unit 14, the output voltage of the transformation unit 13 will be over the required value and climb continuously. Besides, the output voltage can not be reduced as below the required level until the slowly-reacted voltage control loop readjusts the current-set point. The above-mentioned process is called second harmonic generation, and will repeat again and again.

In order to solve the stability problem of the current mode control, the slope compensation technology is presented herein. Because the compensation signal $S_{COMP}$ is generated through the slope compensation, the energy transformation signal $S_{OUT}$ outputted by the transformation unit 13 can be controlled at the desired current, and the whole system can leave out the PID computation and eliminate the drawback of the second harmonic generation. Besides, the current stability and anti-noise capability can be enhanced. Furthermore, since the system just needs the voltage loop computation and doesn't need the current loop PID computation, the requirement of computing capability of the control unit 11 can be reduced a lot.

Figure 2:
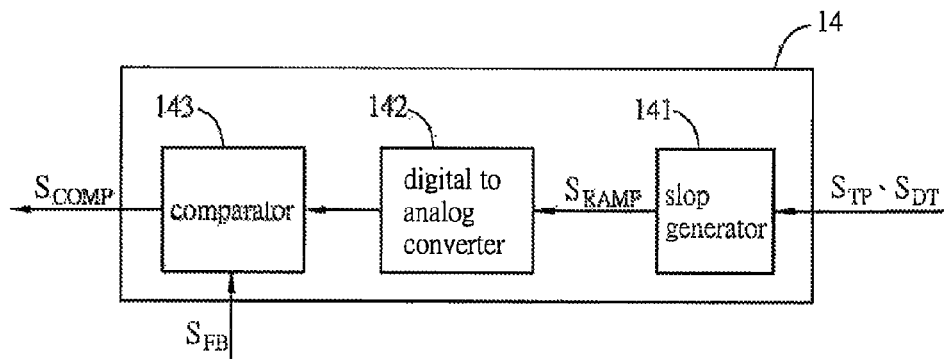
FIG. 2 is a schematic block diagram of a slope compensation unit according to the present invention.

FIG. 2 is a schematic block diagram of a slope compensation unit according to the present invention. As shown in FIG. 2, the slope compensation unit 14 can include a slop generator 141, a digital to analog converter 142 and a comparator 143.

The control unit 11 further outputs a descending tendency signal $S_{DT}$ to the slope compensation unit 14. The descending tendency signal $S_{DT}$ can be a computer instruction. The slope compensation unit 14 processes the target power signal $S_{TP}$ according to the descending tendency signal $S_{DT}$ to generate a ramp signal $S_{RAMP}$. In detail, the slope generator 141 receives the target power signal $S_{TP}$ and the descending tendency signal $S_{DT}$, and, according to them, outputs the ramp signal $S_{RAMP}$ to the digital to analog converter 142.

The digital to analog converter 142 is coupled with the slope generator 141 and receives the ramp signal $S_{RAMP}$, and converts the ramp signal $S_{RAMP}$ (digital signal) into an analog signal. The comparator 143 is coupled with the digital to analog converter 142 and the PWM unit 12. The comparator 143 receives the ramp signal $S_{RAMP}$ and the feedback signal $S_{FB}$, and outputs the compensation signal $S_{COMP}$ according to the ramp signal $S_{RAMP}$ and the feedback signal $S_{FB}$.

Figure 3:
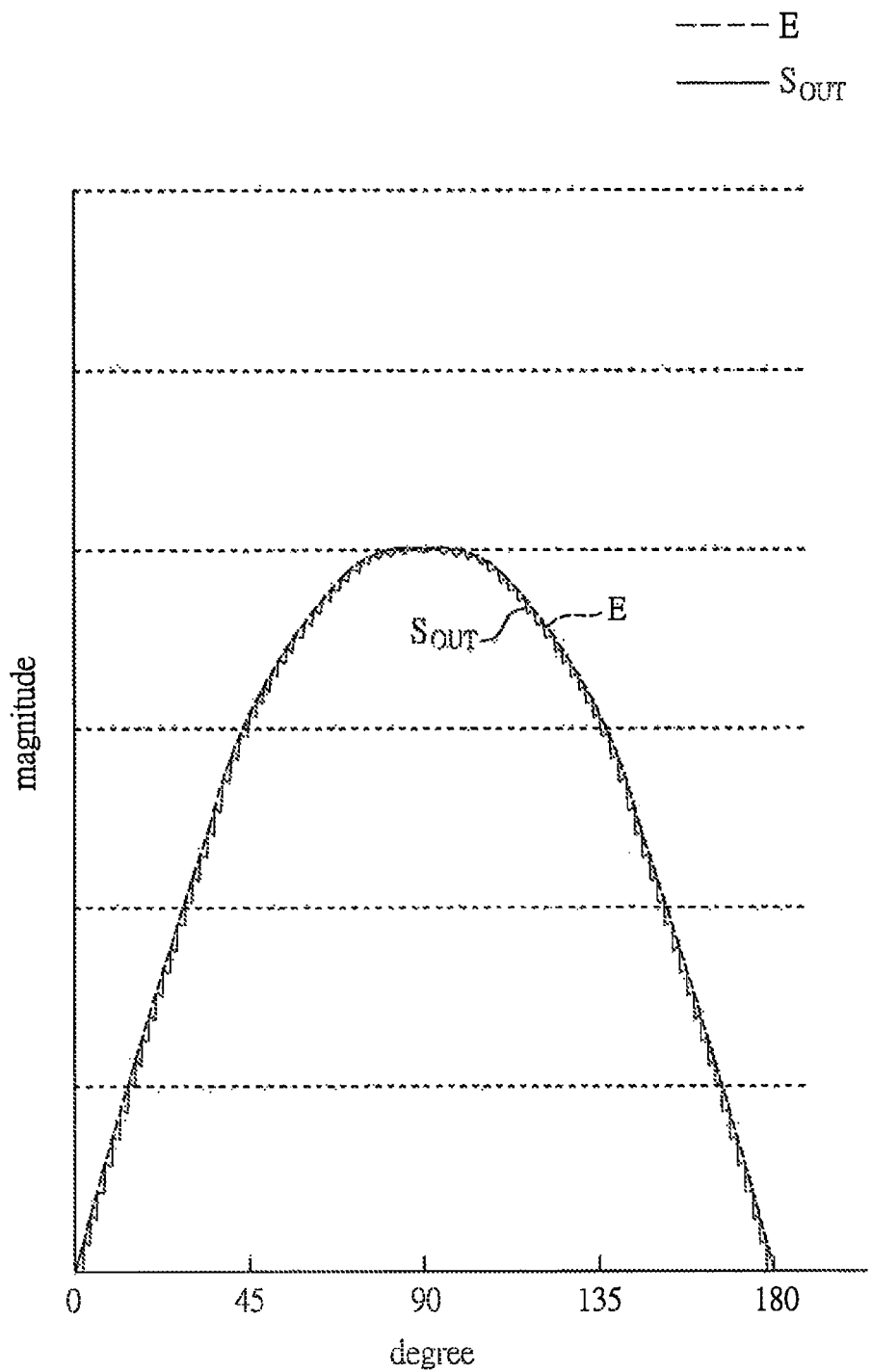
FIG. 3 is a schematic diagram of an actual current waveform of the energy transformation signal according to the present invention.

FIG. 3 is a schematic diagram of an actual current waveform of the energy transformation signal according to the present invention. As shown in FIG. 3, the current waveform of the energy transformation signal $S_{OUT}$ is not a smooth sine wave like its envelope, but is jagged.

Figure 4:
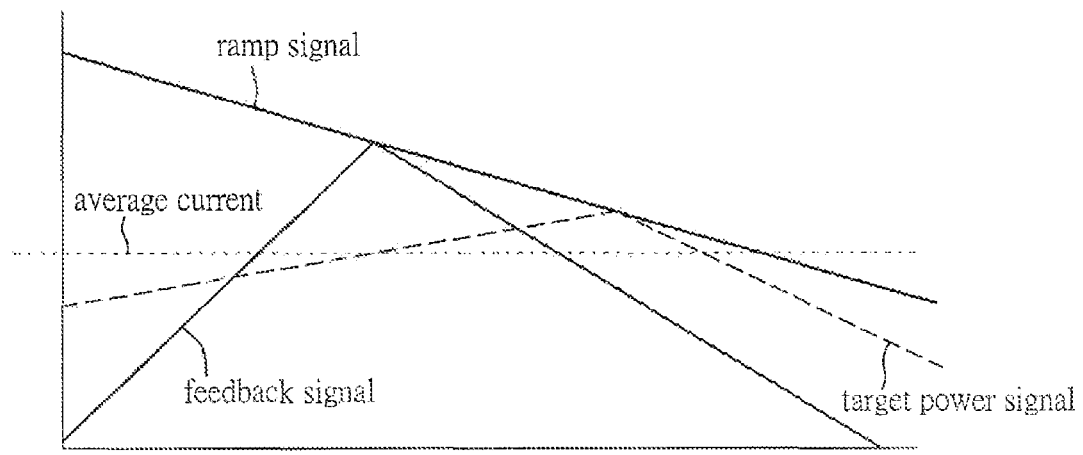
FIG. 4 is a schematic diagram of the signals according to the present invention.

FIG. 4 is a schematic diagram of the signals according to the present invention. As shown in FIG. 4, during a PWM period, the ramp signal $S_{RAMP}$ is a progressively decreasing signal with a negative slope, and the slop is determined by the descending tendency signal $S_{DT}$. Besides, the ramp signal $S_{RAMP}$ must pass through the peak point of the target power signal $S_{TP}$ (current instruction). Thereby, the ramp signal $S_{RAMP}$ can be generated according to the descending tendency signal $S_{DT}$ and the target power signal $S_{TP}$ (current instruction). The ramp signal $S_{RAMP}$ denotes the allowed maximum current value of the feedback signal $S_{FB}$ at different times in a PWM period. Besides, when the current value of the feedback signal Spa reaches the allowed maximum current value at a certain time, the comparator 143 will change the level of the compensation signal $S_{COMP}$, so that the PWM unit 12 doesn't drive the transformation unit 13 to output more current anymore. Thereby, the current of the energy transformation signal $S_{OUT}$ will be reduced, and accordingly the current of the feedback signal $S_{FB}$ is reduced. In other words, the slope compensation effect provided by the slope compensation unit 14 is decreased as time goes by. So, not only the magnitude of the target power signal $S_{TP}$ (current instruction) but also the compensation signal $SCO_{MP}$ determines the duty cycle of the switch signal $S_S$. Therefore, according to the duty cycle of the PWM and the system frequency, the slope compensation is implemented to the value given to the transformation unit 13 with a decrement of a slope compensation value in a fixed period of time, and therefore the second harmonic generation can be prevented, and thus the current waveform of the energy transformation signal $S_{OUT}$ can more approximate a smooth sine wave.

In sum, when the outputted current is higher and higher, the generated noise is larger and larger. For such positive correlation, the ratio of the slope compensation is raised herein. Practically, raising the ratio of the slope compensation can effectively enhance the current stability. In the present invention, the ratio of the slope compensation is adjusted according to the magnitude of the current instruction so that the current stability and anti-noise capability both can be enhanced.

Figure 5:
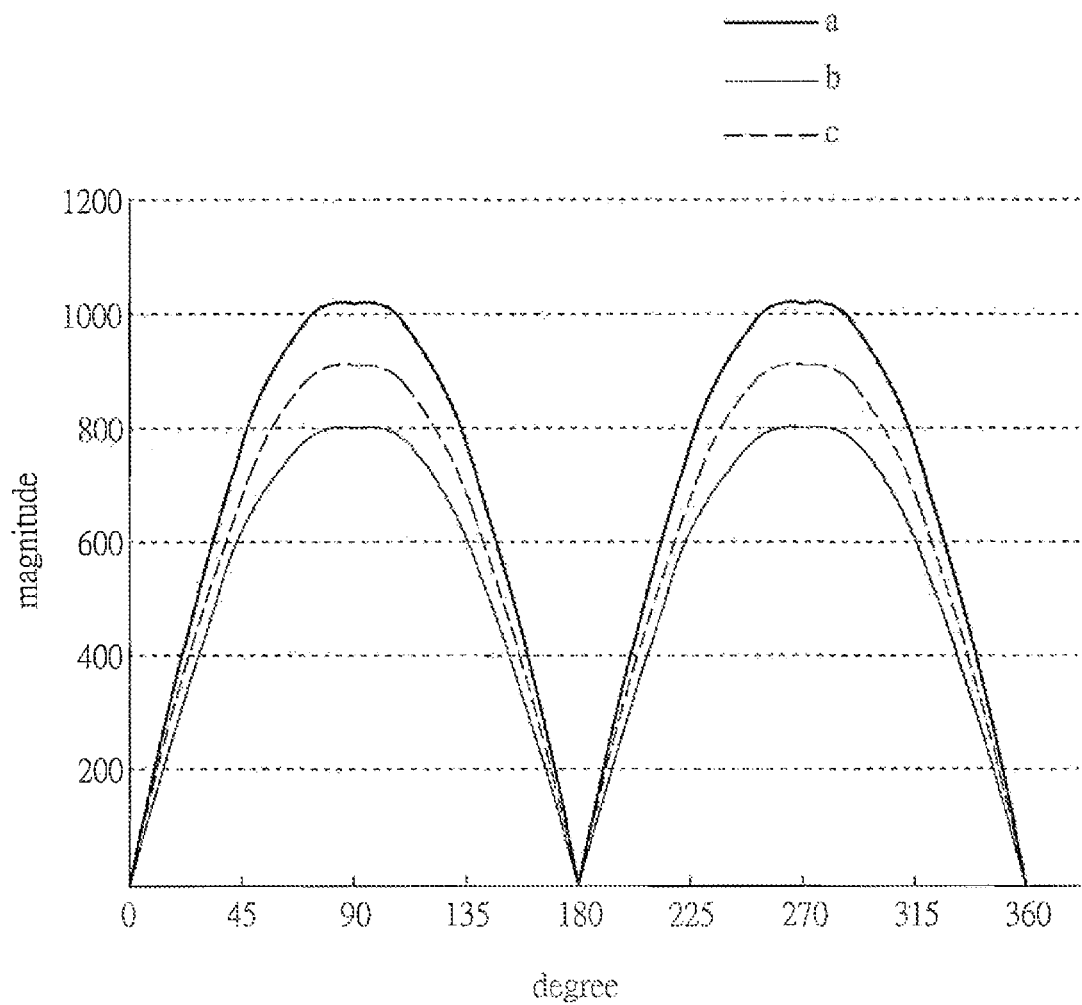
FIG. 5 is a schematic diagram of the target power signal according to the present invention.

FIG. 5 is a schematic diagram of the target power signal according to the present invention, and shows the influence of the slope compensation on the target power signal. As shown in FIG. 5, subtracting the slope compensation value from the target power signal can obtain the influence magnitude of the slope compensation on the target power signal. For example, subtracting the slope compensation value from the maximum value a of the target power signal computed by the control unit 11 can obtain the maximum influence magnitude of the slope compensation on the target power signal, i.e. the minimum value b of the target power signal. Besides, subtracting half the maximum influence magnitude of the slope compensation on the target power signal from half the maximum value of the target power signal can obtain the middle value c of the target power signal.

Figure 6:
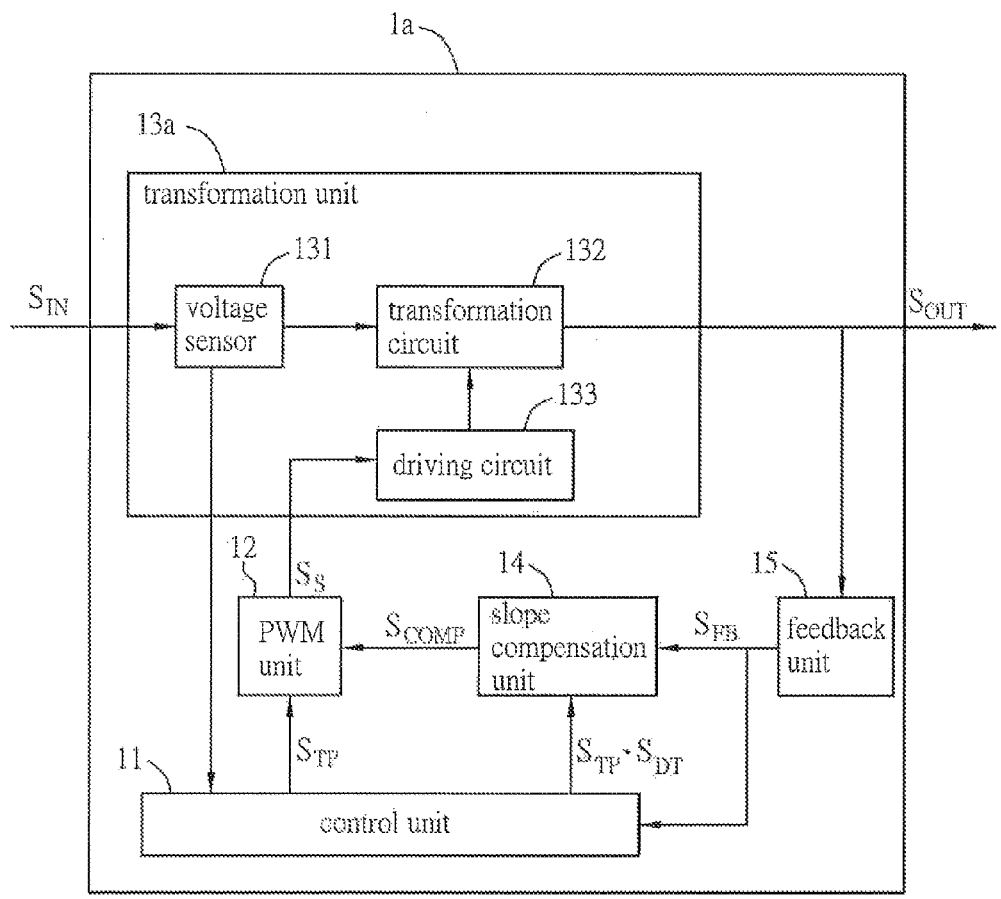
FIG. 6 is a schematic block diagram of a power transforming apparatus according to another preferred embodiment of the present invention.

FIG. 6 is a schematic block diagram of a power transforming apparatus 1a according to an embodiment of the present invention. The power transforming apparatus 1a is similar to the power transforming apparatus 1, but the transformation unit 13a is further illustrated in this embodiment. The transformation unit 13a includes a voltage sensor 131, a transformation circuit 132 and a driving circuit 133.

The voltage sensor 131 is coupled with the control unit 11 and the transformation circuit 132. The voltage sensor 131 can receive the energy signal $S_{IN}$ and detect the voltage value of the energy signal $S_{IN}$ to provide the basis for the control unit 11 for generating the target power signal $S_{TP}$.

The transformation circuit 132 is coupled with the voltage sensor 131, the driving circuit 133 and the feedback unit 15. The transformation circuit 132 includes a plurality of insulated gate bipolar transistors (IGBT) or metal-oxide-semiconductor field-effect transistors (MOSFET), and can transform the energy signal $S_{IN}$ into the energy transformation signal $S_{OUT}$.

The driving circuit 133 is coupled with the PWM unit 12 and the transformation circuit 132. The driving circuit 133 can, according to the switch signal $S_S$ outputted by the PWM unit 12, drive the transformation circuit 132 to operate for transforming the energy signal $S_{IN}$ into the energy transformation signal $S_{OUT}$.

In summary, the power transforming apparatus according to the present invention uses the digital dynamic slope compensation mechanism to eliminate the problem of second harmonic generation. Therefore, the stability of the outputted energy transformation signal is enhanced and the noise influence is reduced. Besides, by using the outputted current as the feedback, the failure of the power transforming apparatus due to the overhigh current can be prevented, and thus the reliability is increased.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power transforming apparatus implementing a transformation of an energy signal, the power transforming apparatus comprising:
   a control unit outputting a target power signal;
   a pulse width modulation (PWM) unit coupled with the control unit and generating a switch signal;

a transformation unit coupled with the PWM unit, and implementing a power transforming of the energy signal to output an energy transformation signal according to the switch signal; and a slope compensation unit coupled with the control unit and the PWM unit, and implementing a slope compensation, according to the target power signal and a feedback signal, to output a compensation signal to the PWM unit, wherein the switch signal is generated according to the target power signal and the compensation signal, wherein the control unit further outputs a descending tendency signal to the slope compensation unit, and the slope compensation unit processes the target power signal to generate a ramp signal according to the descending tendency signal, and outputs the compensation signal according to the ramp signal and the feedback signal.

2. The power transforming apparatus as recited in claim 1, wherein each of the target power signal and the descending tendency signal is a computer instruction.

3. The power transforming apparatus as recited in claim 1, wherein the slope compensation unit comprises:

a slope generator outputting the ramp signal according to the target power signal and the descending tendency signal;

a digital to analog converter coupled with the slope generator and converting the ramp signal of digital signal into an analog signal; and a comparator coupled with the digital to analog converter and the PWM unit, and outputting the compensation signal according to the ramp signal and the feedback signal.

4. The power transforming apparatus as recited in claim 3, wherein the ramp signal denotes an allowed maximum current value of the feedback signal at different times in a PWM period, when a current value of the feedback signal reaches the allowed maximum current value at a certain time, the comparator changes a level of a compensation signal, so that the PWM unit doesn't drive the transformation unit to output current.

5. The power transforming apparatus as recited in claim 1, wherein a representative value of the target power signal is more than a required value of an actual transformation.

6. The power transforming apparatus as recited in claim 1, wherein the energy signal is processed with a full wave rectification.

7. The power transforming apparatus as recited in claim 1, wherein the control unit generates the target power signal according to a voltage of the energy signal and the feedback signal.

8. The power transforming apparatus as recited in claim 1, wherein the transformation unit is a DC to AC transformation unit or a DC to DC transformation unit.

9. The power transforming apparatus as recited in claim 1, wherein the target power signal is corresponding to a target current value of the energy signal after the transformation.

10. The power transforming apparatus as recited in claim 1, further comprising: a feedback unit generating the feedback signal according to the energy transformation signal.

11. The power transforming apparatus as recited in claim 10, wherein the feedback unit is a current sensor to sense the current value of the energy transformation signal outputted by the power transforming apparatus to generate the feedback signal.

12. The power transforming apparatus as recited in claim 10, wherein the feedback signal is a voltage or current value of the energy transformation signal outputted by the power transforming apparatus.

13. The power transforming apparatus as recited in claim 1, wherein the control unit is a micro control unit (MCU).

14. The power transforming apparatus as recited in claim 1, wherein the switch signal is a pulse width modulation (PWM) signal.

15. The power transforming apparatus as recited in claim 14, wherein the PWM unit controls a maximum duty cycle of the switch signal according to the target power signal.

16. The power transforming apparatus as recited in claim 1, further comprising:

a voltage sensor coupled with the control unit, receiving the energy signal and detecting the voltage value of the energy signal to provide a basis for the control unit for generating the target power signal;

a transformation circuit coupled with the voltage sensor and the feedback unit and transforming the energy signal into the energy transformation signal; and a driving circuit coupled with the PWM unit and the transformation circuit and driving the transformation circuit according to the switch signal outputted by the PWM unit to operate for transforming the energy signal into the energy transformation signal.

17. The power transforming apparatus as recited in claim 16, wherein the transformation circuit includes a plurality of insulated gate bipolar transistors (IGBT) or metal-oxide-semiconductor field-effect transistors (MOSFET).

18. The power transforming apparatus as recited in claim 1, which operates in a current mode.

* * * * *